US010539031B2

(12) United States Patent
Beaujard et al.

(10) Patent No.: US 10,539,031 B2
(45) Date of Patent: *Jan. 21, 2020

(54) IMPELLER HAVING SPOILERS FOR A TURBINE ENGINE TURBINE

(71) Applicant: SNECMA, Paris (FR)

(72) Inventors: Jean-Philippe Antoine Beaujard, Chevilly Larue (FR); Roland Gilbert Michel Brault, Quincy sous Senart (FR); Nathalie Nowakowski, Cesson (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 279 days.

This patent is subject to a terminal disclaimer.

(21) Appl. No.: 14/965,817

(22) Filed: Dec. 10, 2015

(65) Prior Publication Data
US 2016/0169014 A1 Jun. 16, 2016

(30) Foreign Application Priority Data
Dec. 11, 2014 (FR) ...................................... 14 62269

(51) Int. Cl.
*F01D 9/04* (2006.01)
*F01D 5/30* (2006.01)
(Continued)

(52) U.S. Cl.
CPC ............... *F01D 9/041* (2013.01); *F01D 5/02* (2013.01); *F01D 5/3015* (2013.01); *F01D 11/02* (2013.01);
(Continued)

(58) Field of Classification Search
CPC . F01D 5/3015; F01D 5/02; F01D 5/30; F01D 5/3007; F01D 11/02; F05D 2230/64
See application file for complete search history.

(56) References Cited

U.S. PATENT DOCUMENTS 3,814,539 A 6/1974 Klompas
5,169,289 A * 12/1992 Lalanne ................ F01D 5/3015
416/219 R
(Continued)

FOREIGN PATENT DOCUMENTS

CA 1279827 2/1991
FR 2666623 3/1992
(Continued)

OTHER PUBLICATIONS

French Search Report, dated Oct. 1, 2015, French Application No. 1462269.

*Primary Examiner* — Christopher Verdier
*Assistant Examiner* — Elton K Wong
(74) *Attorney, Agent, or Firm* — Womble Bond Dickinson (US) LLP (57) ABSTRACT

A turbine engine impeller including a disc bearing vanes, the roots of which are fitted in grooves which are substantially parallel to an axis of revolution of the disc. The root of each vane is connected to a blade by an integrated platform, the platforms of said vanes cooperating so as to form a radially inner wall of a duct for a flow passing through the blades. The impeller further includes two independent annular plates which are fixed to the disc, a first of said plates being mounted upstream of the disc and comprising a transverse annular portion which is supported on an upstream face of the roots of the vanes, and a second of said plates being mounted downstream of the disc and comprising a transverse annular portion which is supported on a downstream face of the roots of the vanes. The integrated platform of each vane stops axially, upstream and downstream, to the right of the upstream and downstream transverse faces of the root, such that said transverse annular portion of each of said plates radially covers at least a space separating the integrated platforms and the disc, and bears, between the integrated platforms and the disc, an annular spoiler which extends in an axial space between the impeller and an adjacent module of the turbine engine without rubbing against an element of said module.

29 Claims, 5 Drawing Sheets

(51) Int. Cl.
*F01D 11/02* (2006.01)
*F01D 5/02* (2006.01)

(52) U.S. Cl.
CPC .... *F05D 2220/323* (2013.01); *F05D 2230/64* (2013.01); *F05D 2240/126* (2013.01); *F05D 2240/55* (2013.01); *F05D 2260/972* (2013.01); *Y02T 50/672* (2013.01)

(56) References Cited

U.S. PATENT DOCUMENTS

| | | | | |
|---|---|---|---|---|
| 2002/0018719 | A1* | 2/2002 | Arilla | F01D 5/3015 416/220 R |
| 2005/0249590 | A1* | 11/2005 | Marchi | F01D 5/081 415/182.1 |
| 2010/0254807 | A1* | 10/2010 | Smoke | F01D 5/08 415/174.2 |
| 2011/0311368 | A1* | 12/2011 | Coupe | B29C 70/222 416/241 A |
| 2013/0323067 | A1* | 12/2013 | Antonellis | F01D 5/3015 416/223 R |
| 2015/0275674 | A1* | 10/2015 | Alvarez Garcia | F01D 5/081 416/95 |
| 2016/0090854 | A1* | 3/2016 | Webb | F01D 5/081 416/220 R |

FOREIGN PATENT DOCUMENTS

| | | |
|---|---|---|
| FR | 2940351 | 6/2010 |
| GB | 2058945 | 4/1981 |

* cited by examiner

IMPELLER HAVING SPOILERS FOR A TURBINE ENGINE TURBINE

FIELD OF THE INVENTION AND PRIOR ART

The present invention relates to the field of impellers in turbine engines, such as a turboprop engine or a turbojet engine comprising ducted or unducted propellers, and more particularly of impellers of turbines of such turbine engines.

Some turbine engines can comprise a low-pressure turbine which is subjected to high loads by a very high rotational speed.

Conventionally, an impeller comprises a rotor disc, the outer periphery of which comprises grooves for mounting, in a direction which is substantially parallel to the axis, and for radially holding vane roots. Each vane is formed with a platform at the interface between a root and a blade. The platforms of the vanes are arranged circumferentially so as to delimit the radially inner wall of an annular duct for flow of the gas stream circulating in the turbine.

Conventionally, a turbine comprises a plurality of successive impellers separated by guide vane stages for guiding the flow in the duct. Said guide vanes are stator elements which generally also comprise a ring of vanes which are attached in particular to an inner collar which delimits the radially inner wall of the annular duct to the right of the guide vane.

In order to allow the rotation of the impellers, the collars of the guide vanes are separated from the platforms of the vanes of the impellers by axial and radial clearances. The same applies between the platforms of the vanes and the inner wall of the input or output duct of the turbine. These spaces where the wall of the duct is not reconstructed are passages through which a portion of the stream can escape, and in particular leak from one stage to the next of the turbine by passing through the guide vanes.

In order to prevent these leaks, which have a detrimental effect on the efficiency of the turbine, it is known to use vanes comprising spoilers which form baffles to deflect and limit the gas leaks. Throughout this document, the term spoiler denotes a part extending substantially axially, in the vicinity of the platforms of the vanes to reconstruct a portion of the duct wall axially outside the vanes. The spoilers form, either in a single piece or by angular sectors, for the platforms of the vanes, an annular surface which acts as an obstacle to the flow of gas in the vicinity of the platforms in the passage left with the adjacent guide vane. The spoilers form a baffle and do not bear any element which is intended to rub against another element to form a sealing joint. Said spoilers are actually integrated in the platforms.

The presence of the spoiler makes manufacturing the vanes more complicated. The turbine vanes are generally produced in a single piece, the spoilers being formed with the platforms and the vane roots. The use of composite materials using ceramics (CMC), in order to withstand high temperatures, poorly accommodates complex shapes and prevents the production of vanes with adapted spoilers.

The presence of the spoilers also makes it more difficult to produce fast-rotating turbines by increasing the loading and the stresses on the vanes.

In order to remedy these problems of mass and difficulty in producing the vanes, it has already been proposed, in WO-A1-2013/072605, to produce an annular spoiler supported by a separate part of the vanes. In this case, the annular spoiler is held axially against the vanes by a plate which is, furthermore, used conventionally for the axial retention of the roots of the vanes. This solution has the advantage of simplifying the manufacture of the vanes and of reducing the stresses to which they are subjected. It also allows a relatively simple assembly of the impeller by successively axially mounting different elements.

However, it increases the number of parts to be assembled, because a specific radial retention means has to be provided for the annular spoiler on the disc or the vanes, and this makes assembly more complicated, in particular when the platforms of the vanes are remote from the disc.

The aim of the invention is in particular to propose an alternative, in particular in the case of turbine engine impellers rotating at high speed, which maintains the above-mentioned advantages whilst simplifying the design of the impeller, making the assembly thereof easier and allowing high rotational speeds. Although it addresses the requirements of a fast turbine first and foremost, the invention can also be applied to other turbines and to compressors.

SUMMARY OF THE INVENTION

For this purpose, the invention relates to a turbine engine impeller, comprising a disc bearing vanes, the roots of which are fitted in grooves which are substantially parallel to an axis of revolution of the disc, the root of each vane being connected to a blade by an integrated platform, the platforms of said vanes cooperating so as to form a radially inner wall of a duct for a flow passing through the blades, the impeller further comprising two independent annular plates which are fixed to the disc, a first of said plates being mounted upstream of the disc and comprising a transverse annular portion which is supported on an upstream face of the roots of the vanes, and a second of said plates being mounted downstream of the disc and comprising a transverse annular portion which is supported on a downstream face of the roots of the vanes, characterised in that the integrated platform of each vane has no spoiler and stops axially to the right of the upstream and downstream transverse faces of the root, in that said transverse annular portion of each of said plates radially covers at least a space separating the integrated platforms and the disc, and bears, between the integrated platforms and the disc, an annular spoiler which is intended to extend in an axial space between the impeller and an adjacent module of the turbine engine without rubbing against an element of said module.

In this design, each plate bearing an annular spoiler, i.e. forming a complete ring in a single piece, it is possible to simplify the design of the vanes and reduce the inertia thereof because the platforms no longer have to include complementary portions reconstructing spoilers and withstanding the inertia forces corresponding to high speed. In fact, the platform of each vane stops to the right of transverse faces of the root, i.e. it is axially contained between the two opposing transverse faces delimiting the root and does not have a spoiler or axial extension which goes beyond said faces, which simplifies producing the vanes with composite materials. In addition, the spoiler of the plate forms a complete ring and does not have the problems of interface between angular sectors for sealing, which can be found with spoilers which are integrated on the platforms of the vanes.

Furthermore, the transverse annular portion bearing said annular spoiler also makes it possible to axially stop the roots, thus to hold the vanes in the grooves in the disc.

Secondly, in comparison with the above-mentioned example, it is the plate itself, which is additionally fixed to the disc, which directly absorbs the radial forces produced by the spoiler during the rotation of the disc. There is thus no need to provide a complementary device for holding the annular spoiler. In addition, annular plates make it possible to produce integral annular spoilers over the entire circumference of the impeller. Together with the transverse annular portion closing the space between the platforms and the disc, the plates thus make it possible to avoid the gas escaping through the radial clearance between the platforms of the vanes and the adjacent rotor from passing between segments reconstructing a spoiler.

Since the annular spoiler of each of said plates is located radially between the integrated platforms and the disc, it is correctly placed to form a baffle with, for example a complementary spoiler which is fixed to a stator element, in the radial passage between the impeller and said stator. It also makes it possible to guide the air stream from the duct through which the vanes pass in the continuity of the wall formed by the platforms.

Furthermore, the fact that the two plates are independent makes it possible to fix them independently to the impeller. Advantageously, each plate is also completely on the same axial side of the vanes and the disc, and this makes it possible to successively carry out the mounting on the disc of a first plate, then the vanes, then the second plate. This makes it possible to make use of the annular appearance of the plates to facilitate the axial mounting of the impeller.

Advantageously, said annular spoiler of each of said plates has a substantially cylindrical general shape.

The outer radial end of said transverse annular portion of at least one of said plates can be axially supported on said integrated platforms and/or be flush with a radially outer surface of said integrated platforms.

It is thus possible to reconstruct the continuity of the duct wall at the ends of the platforms. An axial support, unlike a radial support, makes it possible to avoid the plate inducing stresses on the platforms during high rotational speeds. This also makes it possible to limit leaks of the flow between the plate and the platforms.

Preferably, the transverse annular portion of at least one of said plates covers the root of each vane over the entire radial dimension thereof.

This makes it possible to close the passage of gas coming from the duct of the turbine and/or to control the passage of an auxiliary stream of cooling air to the roots of the vanes.

At least one of the plates comprises a scalloped portion which is shaped so as to cooperate in a form-fitting manner with a complementary scalloped portion of the disc, so as to fix said plate to the disc. Such a connection avoids the use of screws or nuts. Said connection also makes it possible to hold the plate pressed against the roots of the vanes during the rotation of the turbine when this form-fitting connection is located axially to the right of the end of the roots.

Preferably, at least one of said plates comprises at least one finger extending substantially axially from the side of the disc, said finger being inserted in a groove for receiving a vane root of the disc or a cavity of the disc, such as a cavity in a tooth of the disc.

In particular, said finger can be axially inserted under the root of a vane and is designed so as to be able to be radially supported under said root so as to create with the spoiler, during a rotation of the impeller, a torque driving said transverse annular portion towards the roots of the vanes.

Advantage is thus taken of a radial clearance which generally exists between the base of the root and the bottom of the groove, and this avoids weakening the rim of the disc and makes it possible to adapt the plate without modifying the root of a vane.

Said finger can also be designed so as to be able to be radially and/or circumferentially supported on at least one tooth portion of the disc.

Said finger is particularly useful in the case in which the fixing of the plate to the disc is far away from the impeller so as to adapt to the geometry of the turbine and to be placed in the region of the stator. The portion of the plate holding the spoiler against the vanes is thus far away from said fixing. As a result of the centrifugal forces, the portion of the plate between the vanes and the means for fixing to the disc is thus at a risk of deforming and leading to detachment of the plate with respect to the vanes. The radial retention of the plate to the right of the roots, together with the effects of the torques induced by the presence of the spoiler during the rotation of the impeller at high speed, makes it possible to facilitate the support of the plate against the roots of the vanes over the entire height thereof, in the radial direction, even if the root extends far from the base of the vane roots. Detachment of the plate in the region of the spoiler and a failure in reconstructing the wall of the duct in the turbine between the platforms and the radial end of the plate are thus avoided.

The circumferential support makes it possible to screw the plate in rotation with respect to the disc of the impeller.

Preferably, at least one of said plates comprises a radially inner annular flange for fixing to the disc. Said flange can be located axially outside the spoiler with respect to the disc.

Advantageously, at least one of said plates comprises annular knife-edge seals of a labyrinth sealing joint.

This makes it possible to integrate said plate in an assembly design to limit the passages of air under the inner wall of the duct through the stator stages between two rotors of a turbine.

Preferably, said at least one plate is arranged so as to form an airtight wall connecting the integrated platforms of the vanes and the knife-edge seals.

This design makes it possible to use the plate to radially inhibit, towards the centre, the passage of the gas from the duct between two successive impellers.

Advantageously, said at least one plate comprises a portion bearing the knife-edge seals which is located between the transverse annular portion and said fixing flange.

The invention also relates to a turbine engine turbine comprising at least one impeller of the type described above.

BRIEF DESCRIPTION OF THE DRAWINGS

The present invention will be better understood, and other details, features and advantages of the present invention will become clearer upon reading the following description of a non-limiting example with reference to the accompanying drawings, in which.

DESCRIPTION OF EMBODIMENTS

Figure 1:
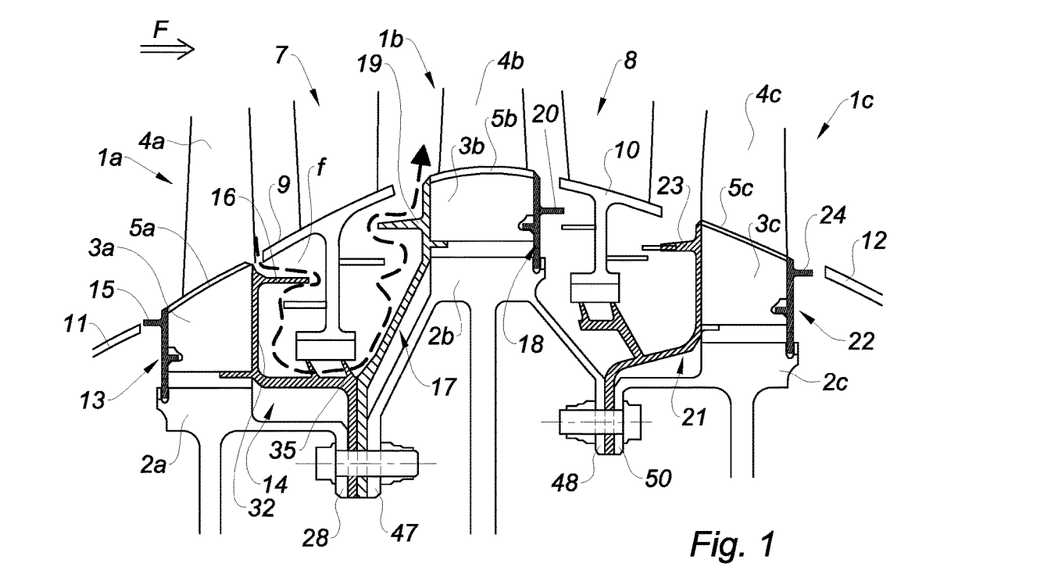
FIG. 1 is a schematic, longitudinal sectional view of the portion close to the radially inner wall of the duct in a turbine according to the invention.

The production of a low-pressure turbine of the type shown in FIG. 1 makes it possible to illustrate different types of plates bearing annular spoilers on impellers, the vanes of which have simple platforms which make it possible for example to conceive of producing them from CMC.

With reference to FIG. 1, the example of a turbine comprises three successive impellers $1a$, $1b$, $1c$. Each impeller $1a$, $1b$, $1c$ comprises a disc rotating about the axis of the turbine (not shown) and comprising an outer peripheral rim $2a$, $2b$, $2c$ to which the vanes are fixed by the root $3a$, $3b$, $3c$ thereof.

In the rest of the presentation, the concepts of axial, radial and transverse direction or dimension, as well as of meridian and transverse planes, are made with reference to this axis of rotation of the turbine. Similarly, the terms upstream and downstream refer to the direction of the flow along said axis of rotation of the gas stream F in the duct of the turbine, coming from the upstream portions of the turbine engine.

The blades $4a$, $4b$, $4c$ of the vanes rotate in the duct and interact with the gas stream F. Each vane comprises a platform $5a$, $5b$, $5c$ between the root $3a$, $3b$, $3c$ and the blade $4a$, $4b$, $4c$. Said platforms $5a$, $5b$, $5c$ are shaped so as to be circumferentially joined and to form the radially inner wall of the duct for the passage of the gas stream F in the region of the blades $4a$, $4b$, $4c$.

Figure 2:
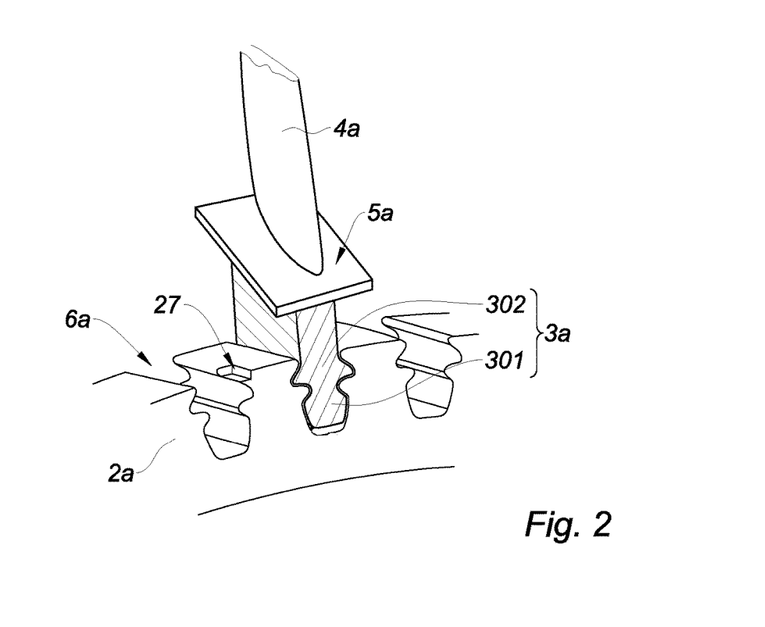
FIG. 2 is a perspective view of a portion of a disc of an impeller according to the invention on which a vane is mounted.

With reference to FIG. 2, which shows a detail of mounting on the first impeller for example, it can be seen that the outer rim $2a$ of the disc comprises grooves $6a$ passing axially through the rim $2a$. Said grooves $6a$ are distributed regularly over the circumference, and these are also the hollow shapes of teeth which are regularly distributed over the rim $2a$. The root $3a$ of a vane can be axially mounted in a groove $6a$ by the radially inner portion $301$ thereof, in a dovetail or fir-tree shape, so as to radially hold the vane on the disc. The roots $3a$ of the vanes are fitted in the grooves $6a$, i.e. the radially inner portions $301$ thereof are engaged with small clearances or with a tight fit in said grooves $6a$. Upstream and downstream, said root $3a$ stops axially in the transverse plane delimiting the rim $2a$ of the disc and comprises supporting surfaces in said plane.

Furthermore, said root $3a$ comprises a stilt $302$, in the radial periphery of which the platform $5a$ is located, which is radially remote from the outer periphery of the rim $2a$ of the disc and which is shaped so as to follow the axial shape of the inner wall of the duct for the passage of the gas stream F. In the example in question, the platforms $5a$ of the vanes of the impeller $1a$ are joined along meridian planes, so as to reconstruct a continuous annular wall of the duct of the gas stream F, in the region of the impeller $1a$.

The features presented above for the first impeller $1a$ with reference to FIG. 2 also apply to the two other impellers $1b$, $1c$ of the turbine.

In FIG. 1, it can also be seen that the turbine also comprises two stators 7, 8 acting as guide vanes for the gas stream F and placed between two successive impellers $1a$, $1b$; $1b$, $1c$.

Each guide vane 7, 8 comprises in particular a radially inner collar 9, 10 forming the inner wall of the duct of the gas stream F in the region of the guide vane 7, 8.

To allow the rotation of the impellers, the collars 9, 10 of the guide vanes have an axial clearance with the platforms $5a$, $5b$, $5c$ of the vanes of the adjacent impellers $1a$, $1b$, $1c$. The same applies between the inner wall 11 of the input duct and platforms $5a$ of the first impeller $1a$, as well as between the inner wall 12 of the output duct and the platforms $5c$ of the third impeller $3a$. Said spaces are openings which potentially allow flows leaking from the main flow F to pass between successive stages of the turbine engine, such as the flow f shown by an arrow in dashed lines in FIG. 1, going from the first impeller $1a$ towards the second impeller $1b$, passing under the first guide vane 7.

According to one aspect of the invention, on the first impeller $1a$ departing from upstream, for example, each vane which is axially mounted by the root $3a$ thereof in the grooves $6a$ in the rim $2a$ of the disc is inhibited axially upstream by an annular plate 13 of a first type and axially downstream by an annular plate 14 of a second type, each of the plates 13, 14 bearing an annular spoiler 15, 16.

The upstream annular plate 13, of the first type, is essentially in the shape of a transverse flat ring, one face of which is pressed against the rim $2a$ of the disc. The spoiler 15 extends from the plate 13 in the region of the axial clearance between the inner wall 11 of the upstream duct and the platforms $5a$ of the vanes, so as to reduce the passage cross section and limit the rate of flow of leaks. In a similar manner, the spoiler 16 extends axially downstream from a transverse annular portion 32 of the downstream plate 14, which portion is pressed against the downstream transverse face of the rim $2a$ and the roots $3a$ of the vanes. In this case, said spoiler 16 extends under the platform 9 of the first guide vane 7. In this manner, it is possible to create a baffle effect to reduce the leak flow f.

Unlike in the prior art, said spoilers 15, 16 are not formed from the vanes. The platforms $5a$ can thus stop axially to the right of the roots $3a$ of the vanes, and are thus less complicated and less heavy. In addition, since the spoilers 15, 16 are connected to the annular plates 13, 14, they can be formed in one piece with said plates 13, 14; whereas, in the prior art, each vane comprises a spoiler element, the combination of which forms the annular spoiler. This thus represents an additional simplification.

In FIG. 1, it can thus be seen that the three impellers $1a$, $1b$, $1c$ of the turbine presented comprise upstream plates 13, 17, 21 and downstream plates 14, 18, 22 bearing spoilers 15,19, 23 extending upstream and spoilers 16, 20, 24 extending downstream respectively. Said spoilers and said plates have different shapes according to the location thereof in the turbine. The upstream plate 13, 17, 21 and the downstream plate 14, 18, 22 of each impeller $1a$, $1b$, $1c$ are independent because they are fixed on each side of the impeller, by different means, and can thus be mounted or dismounted independently. In addition, the function of axially stopping one of the plates in a given direction is independent of the presence or absence of the other plate.

It is proposed hereinafter to present the different combinations of plates and impellers, and the properties thereof, following the steps of mounting a turbine of the type shown in FIG. 1.

A first step consists in mounting the upstream plate 13 of the first impeller 1a on said impeller.

Figure 3:
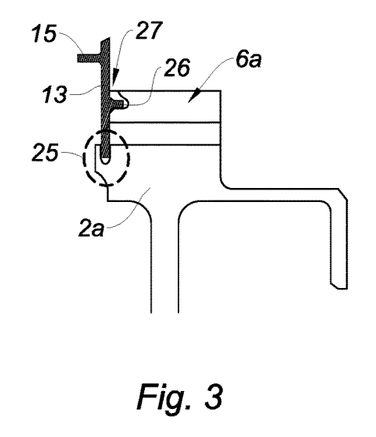
FIG. 3 is a longitudinal sectional view of a portion of the first impeller from FIG. 1 after a first mounting step.

With reference to FIG. 3, the upstream plate 13, of a first type, is essentially in the shape of a transverse flat ring. Said plate is fixed to the disc by a form-fitting-type connection 25 on the rim 2a, in the transverse plane delimiting the rim 2a upstream and radially under the grooves 6a which are intended to receive the roots 3a of the vanes.

Figure 4:
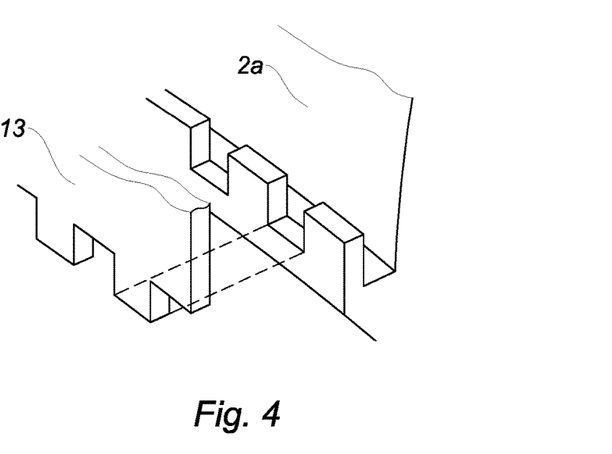
FIG. 4 is a schematic, perspective view of the detail of an example of scallops for a form-fitting connection.

In order to produce the form-fitting connection 25, for example, the inner periphery of the plate 13 is scalloped, i.e. it comprises a ring of teeth extending radially towards the inside with a given pitch. FIG. 4 schematically illustrates this principle by showing a series of slots going into the plate 13 and, in a complementary manner, a ring of teeth extending radially towards the outside, having the same pitch and the same radial extension, which is rigidly connected to the rim 2a of the disc and separated from said rim by a groove having the same width as the plate 13. The shapes and the proportions of the teeth and the groove are parameters which are adapted by a person skilled in the art. In order to assemble the plate 13 on the rim 2a, the teeth of the plate 13 must thus be passed axially between those of the rim 2a so they can be mounted in the groove, then turned by a half step.

Since the plate 13 is annular, it is furthermore sufficient to circumferentially lock said plate so that it is fixed to the rim 2a of the disc. For this purpose, the plate 13 comprises a number of fingers 26, preferably at least three, which extend radially from the face of said plate which is turned towards the rim 2a, in the region of the grooves 6a of the rim 2a.

Such a finger 26 is shown in FIG. 3, when the plate 13 is mounted on the disc and the form-fitting connection 25 has been axially locked. Said finger 26 is thus inserted in a cavity 27 in the rim 2a. Such a cavity 27 is shown schematically in FIG. 2. In this case, said cavity 27 is made in a side wall of a groove 6a, which is also the wall of a tooth contained between two adjacent grooves 6a. The finger 26 is pressed against the side wall of the cavity 27. Furthermore, the width of the finger 26 is substantially equal to the circumferential extension of the cavity 27, in such a way that the finger 26 is flush with the surface of the groove 6a.

Advantageously, when there are for example three fingers 26 distributed over the circumference, positioning said three fingers 26 in complementary cavities 27 on the rim 2a makes it possible to radially lock the plate 13. In particular, if there is a radial clearance between the groove of the form-fitting connection on the rim 2a and the plate 13, this makes it possible to centre the plate 13 with respect to the impeller. Preferably, the finger or fingers 26 are radially supported on one of the faces of the corresponding cavity 27 when they are in place.

It goes without saying, in the example in question, that the pitch of the rings of teeth of the form-fitting connection 25, and the dimensions of the finger 26, are arranged in such a way that the finger 26 passes through the groove 6a when the plate 13 is axially inserted in the form-fitting connection 25 before the plate 13 is turned so that it is axially locked.

Figure 5:
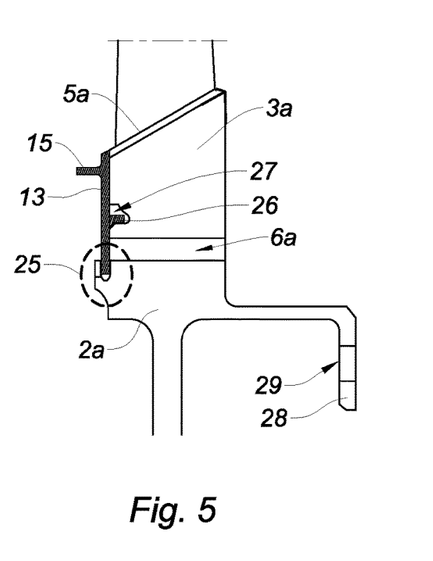
FIG. 5 is a longitudinal sectional view of a portion of the first impeller from FIG. 1 after a second mounting step.

In a second step, with reference to FIG. 5, the roots 3a of each vane of the first impeller 1a are then axially inserted from downstream in the grooves 6a in the rim 2a of the disc.

As can be seen in this figure, the finger 26 shown in the preceding figure allows the root 3a to be passed until it is stopped upstream by the downstream transverse face of the plate 13. In this position, the finger 26 is circumferentially locked by the root 3a. The plate 13 is thus completely locked with respect to the disc of the impeller 1a. Since the circumferential forces are limited, only a few fingers 26 of this type are required to effectively lock the plate 13. It should be noted that this mounting does not require the shape of the roots 3a of the vanes to be adapted. It makes it possible to use a single type of part for the vanes of the first impeller 1a.

With reference to FIG. 5, it is also noted that the plate 13 extends radially over the entire height or radial dimension of the roots 3a of the vanes. The plate 13 is also axially supported against a portion of the rim 2a which is radially inside the roots 3a, and against the radial end of the platforms 5a of the vanes. In this case, the radial end of the plate 13 is shaped so as to follow, in axial continuity, the outer surface of the platforms 5a of the vanes.

In this case, the plate 13 and the platforms 5a are joined with an axial support. The plate 13 has no radial support on the platforms 5a or on the roots 3a. It thus does not induce any centrifugal force during the rotation of the turbine.

The transverse ring formed by the plate 13 in this case can completely cover the grooves 6a for receiving the roots 3a of the vanes. Secondly, it can axially close the annular space between the platforms 5a of the vanes and the rim 2a of the disc. This configuration makes it possible to guide the flow F in the duct along the platforms 5a whilst minimising the pressure losses and/or the formation of leak flows under the platforms 5a.

The annular spoiler 15, extending axially upstream, is arranged in this case on the upstream plate 13 close to the platforms 5a. With reference to FIG. 1, the surface of the duct of the stream circulating in the turbine is radially divergent in the region of the first impeller 1a. In this case, the spoiler 15 is designed so as to come close to the surface of the inbound duct 11 whilst remaining radially under the surface of said duct 11.

In a third step, the downstream plate 13 is mounted, axially from downstream, on the first impeller 1a.

Figure 6:
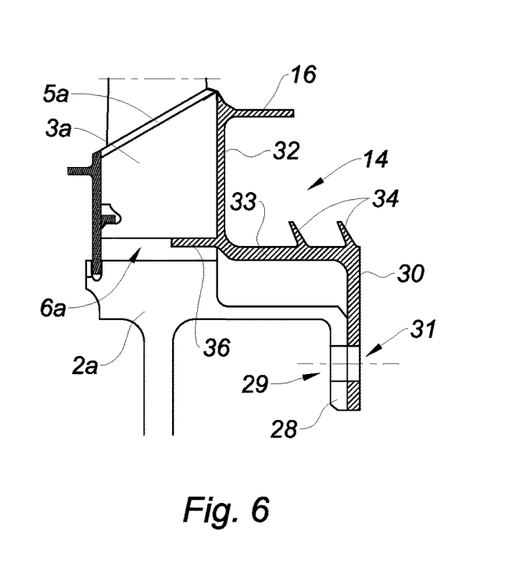
FIG. 6 is a longitudinal sectional view of a portion of the first impeller from FIG. 1 after a third mounting step.

With reference to FIG. 6, it is firstly noted that the first impeller 1a comprises an assembly ring 28 which is radially inside the rim 2a and axially remote downstream. Said ring 28, which is used for the assembly with the second impeller 2a, is rigidly connected to the disc by means, in this case, of a substantially cylindrical portion which is rigidly connected to the rim 2a. Said ring comprises a plurality of axial openings 29 which are distributed circumferentially and are intended to allow a screw to pass through.

The downstream plate 14, of a second type with respect to the upstream plate 13, comprises:

- a transverse annular fixing flange 30 which extends radially towards the inside, which is penetrated by axial holes 31 which are distributed circumferentially and correspond to the axial openings 29 in the assembly ring 28 of the first impeller 1a;
- a transverse annular portion 32 which is intended to stop the roots 3a of the vanes, and which bears the spoiler 16 which extends axially downstream; and
- an intermediate portion 33, in this case having a substantially cylindrical shape, which bears knife-edge seals 34 which are intended to participate in a radial labyrinth sealing joint 35, indicated in FIG. 1.

The mounting of the downstream plate 14 is carried out axially in this case, by orienting it circumferentially in such a way that the holes 31 in the fixing flange 30 of the plate 14 are opposite the openings 29 in the assembly ring 28 of the first impeller 1a.

The transverse annular portion 32 supporting the spoiler 14 in this case extends radially towards the outside until it makes a joint with the platform 5a of the vanes. Said portion is axially supported on the downstream transverse face of the rim 2a and on the roots 3a. The transverse annular portion 32 covers the roots 3a as far as the radially inner base thereof. Said transverse annular portion 32 thus makes it possible to separate in an airtight manner, downstream of the vanes, the spaces located radially above and below the roots 3a.

In addition, at least one finger 36, preferably a plurality of fingers which are distributed regularly over the circumference, extends axially upstream of the transverse annular portion 32. Such a finger 36 is shown in FIG. 6. Said finger is preferably located close to the radially inner edge of the transverse annular portion 32 resting on the roots of the vanes. It is arranged so as to be able to be inserted in a cavity in the rim 2a when the plate 14 is supported against the first impeller 1a and the holes 31 in the fixing flange 30 thereof are positioned so as to correspond to the openings 29 in the assembly ring 28.

Preferably, as indicated in FIG. 6, said finger 36 is inserted in a mounting groove 6a, under the root 3a of a vane. In this position, each finger 36 can be radially supported against the base of a root 3a of a vane when the impeller 1a is in rotation, thus radially locking the plate 14 in the region of the base of the vane roots 3a. In addition, said fingers 36, which are circumferentially locked in the corresponding grooves 6a, make it possible to keep the holes 31 in the fixing flange 30 of the plate 14 opposite the openings 29 in the assembly ring 28 of the first impeller 1a during the mounting.

Furthermore, FIG. 6 schematically shows the passage of such a finger 36 under a root 3a of a vane, in the radial clearance which is generally left between the roots 3a and the bottom of the grooves 6a. It is also noted in this case that the mounting of the downstream plate 14 makes it possible to use a single model of vanes for the first impeller 1a.

Figure 7:
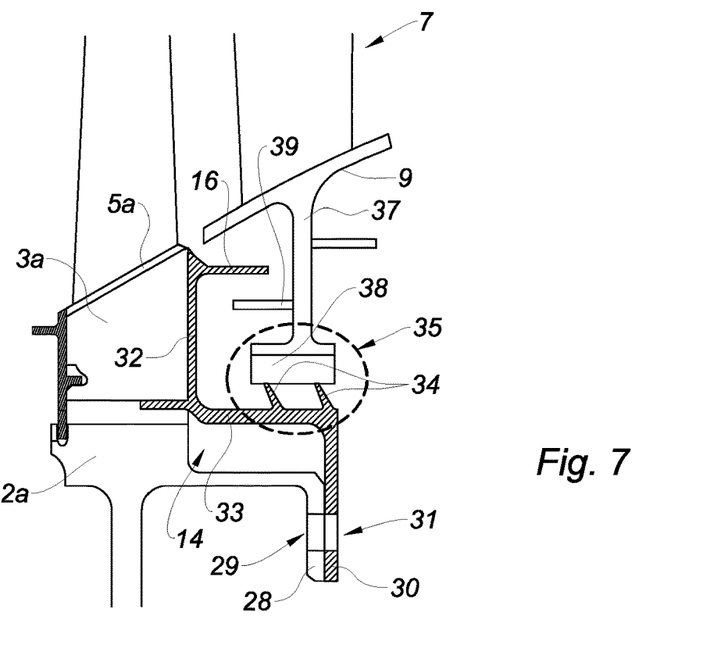
FIG. 7 is a longitudinal sectional view of a portion of the first impeller and of the first guide vane from FIG. 1 after a fourth mounting step.

In a fourth step, with reference to FIG. 7, the first guide vane 7 is mounted behind the first impeller 1a, which is equipped with the plates 13, 14 thereof.

It can be noted in this case that the inner collar 9 of the guide vane 7, which forms, in the extension of the platforms 5a of the first impeller 1a, the inner wall of the duct of the stream F in the turbine, bears a web 37 which extends radially towards the inside. The inner periphery of the web 37 bears an abradable element 38 which cooperates with the knife-edge seals 34 of the downstream plate 14 so as to form a labyrinth seal 35. The abradable element 38 in this case is a ring of abradable material which radially comes into contact with the knife-edge seals 34.

The spoiler 16 supported by the downstream plate 14 of the first impeller 1a extends under the collar 9 of the first guide vane 7 and, in this example, the axial extension thereof takes up the majority of the gap between the transverse portion 32 of the downstream plate 14 and the web 37 of the first guide vane 7.

In this case, the web 37 of the first guide vane 7 bears another annular spoiler 39, which is radially inside the spoiler 16 of the plate 14, and has an axial overlap therewith, so as to form an additional baffle.

In a fifth step, the upstream plate 17 of the second impeller 1b is placed on the assembly obtained in the fourth step.

Figure 8:
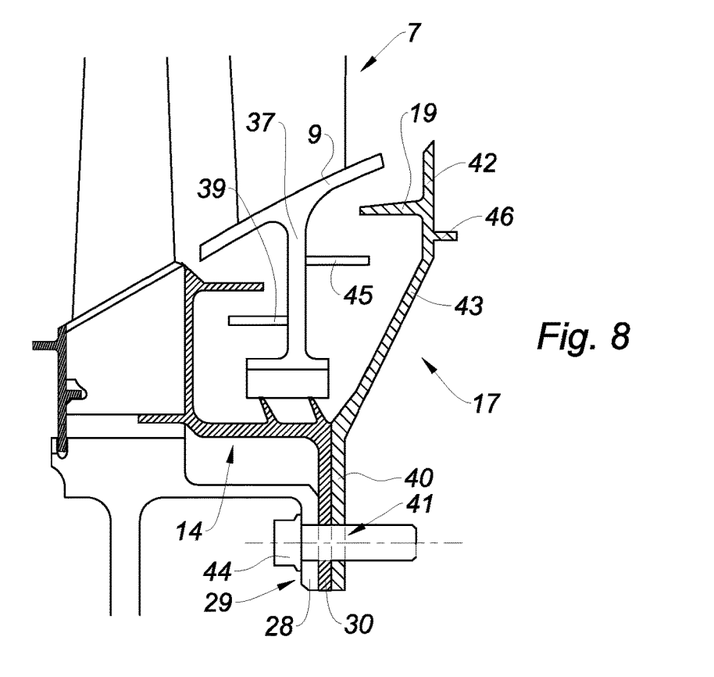
FIG. 8 is a longitudinal sectional view of a portion of the first impeller and of the first guide vane from FIG. 1 after a fifth mounting step.

With reference to FIG. 8, said plate 17 corresponds to a third type of plate. Similarly to the previous type, said plate 17 comprises:

a transverse annular flange 40 for fixing to the impellers which extends radially towards the inside, which comprises axial holes 41 which are distributed circumferentially and correspond to those 29 in the mounting ring 28 of the first impeller 1a, a transverse annular portion 42 which is intended to form a stop upstream of the roots 3b of the vanes of the second impeller 1b, and an intermediate portion 43, which in this case has a frustoconical shape.

In said fifth step, screws 44 will have been inserted through the openings 29 in the assembly ring 28 of the first impeller 1a beforehand. Since said screws 44 go past the annular fixing flange 30 of the downstream plate 14 of the first impeller 1a, the fixing flange 40 of the upstream plate 17 of the second impeller 1b can be pressed against that of the downstream plate 14 by passing the screws 44 through the corresponding holes 41.

It can be seen, in FIG. 8, that this third type of plate 17 looks like the second type of plate 14. The transverse annular portion 42, which is intended to stop the roots 3b of the vane axially upstream, bears an annular spoiler 19 which extends substantially axially upstream. As for the previous type, this spoiler 19 extends under the collar 9 of the first guide vane 7 and fills more than half of the gap between the web 37 of the guide vane 7 and the annular portion 42 of the plate 17. Furthermore, the web 37 of the guide vane 7 can also comprise an annular spoiler 45, which is radially inside the spoiler 19 of the plate 17, and has an axial overlap therewith.

Like the previous type of plate, the transverse annular portion 42 of the plate 17 bears, towards the radially inner edge thereof, a plurality of fingers 46 which extend radially downstream and are intended to be inserted in grooves 6b in the second impeller 1b.

In this case, the intermediate portion 43 of the plate 17 instead has a frustoconical shape. This is due to the fact that the diameter of the second impeller 1b is greater, as can be seen in FIG. 1. However, the main difference with the second type of plate 14 is that the intermediate portion 43 of the plate 17 does not bear any elements participating in a labyrinth seal.

Before mounting the second impeller 1b, two steps are carried out thereon which substantially correspond to the two first steps of mounting on the first impeller 1a.

Figure 9:
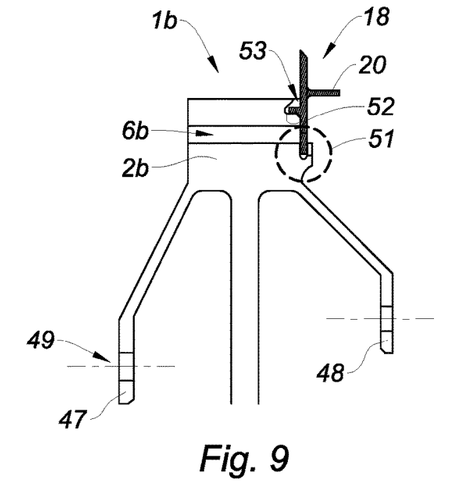
FIG. 9 is a longitudinal sectional view of a portion of the second impeller from FIG. 1 after a sixth mounting step.

With reference to FIG. 9, the second impeller 1b comprises a first assembly ring 47, upstream of the rim 2b of the disc, and a second ring 48, downstream of the rim 2b of the disc. These two rings 47, 48 are attached to the rim 2a of the disc by collars or frustoconical flanges. The first ring 47 has a diameter which corresponds to that of the mounting ring 28 of the first impeller 1a and it comprises axial openings 49 which are distributed circumferentially so as to correspond to the screws 44 passing through the openings 29 in the assembly ring 28 of the first impeller 1a. The same applies to the second ring 48 of the second impeller 1b with respect to a mounting ring 50 for the third impeller 1c, as can be seen in FIG. 1. The diameters of these rings 47, 48 are thus in this case clearly less than that of the rim 2b of the disc of the second impeller 1b.

In this case, in a sixth step, a plate 18 similar to the plate 13 which is mounted upstream of the first impeller 1a in the first step is mounted downstream of the rim 2b of the disc of the second impeller 1b.

As with the upstream plate 13 of the first impeller 1a, the downstream plate 18 of the second impeller 1b substantially consists of a transverse flat ring which extends in front of the roots 3b of the vanes. As previously, the rim 2b of the disc and the inner periphery of the downstream plate 18 are designed in such a way that the downstream plate 18 can be fixed there by a form-fitting connection 51. As previously, the downstream plate 18 comprises one or more fingers 52 which are rotated, in this case, upstream and are inserted in cavities 53 in the edges of the grooves 6b, as can be seen in FIG. 9.

Figure 10:
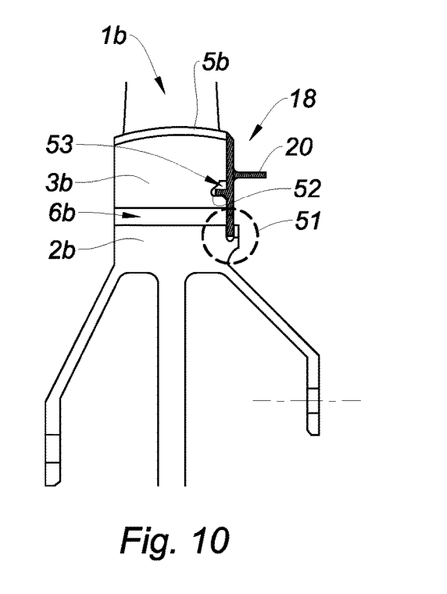
FIG. 10 is a longitudinal sectional view of a portion of the second impeller from FIG. 1 after a seventh mounting step.

In a seventh step, the roots 3b of the vanes are axially inserted in the grooves 6b through the upstream face of the rim 2b. With reference to FIG. 10, similarly to the first impeller 1a, the roots 3b of the vanes thus in place permanently fix the downstream plate 18, preventing it from rotating.

Similarly to the upstream plate 13 of the first impeller, said downstream plate 18 bears an annular spoiler 20 extending axially downstream, close to the platforms 5b of the vanes. The downstream plate in this case is axially supported against the platforms 5b and the radially outer end thereof is flush with the surface of the platforms 5b forming a continuation of the wall of the duct of the gas stream F downstream of said platforms.

The eighth step corresponds to the mounting of the second impeller 1b on the assembly obtained in the fifth step. In said eighth step, the openings 49 of the upstream assembly ring 47 of the second impeller 1b are inserted around the screws 44 passing through the openings 29 in the assembly ring 28 of the first impeller 1a and the holes 31, 41 in the flanges 30, 40 for fixing the two plates 14, 17 in place. The connection between the first impeller 1a and the second impeller 1b is thus locked by tightening a nut 54 onto each screw 44, as can be seen in FIG. 11.

This connection between the two successive impellers 1a, 1b is also used to fix the downstream plate 14 of the first impeller 1a and the upstream plate 17 of the second impeller 1b to the respective impellers thereof.

Figure 11:
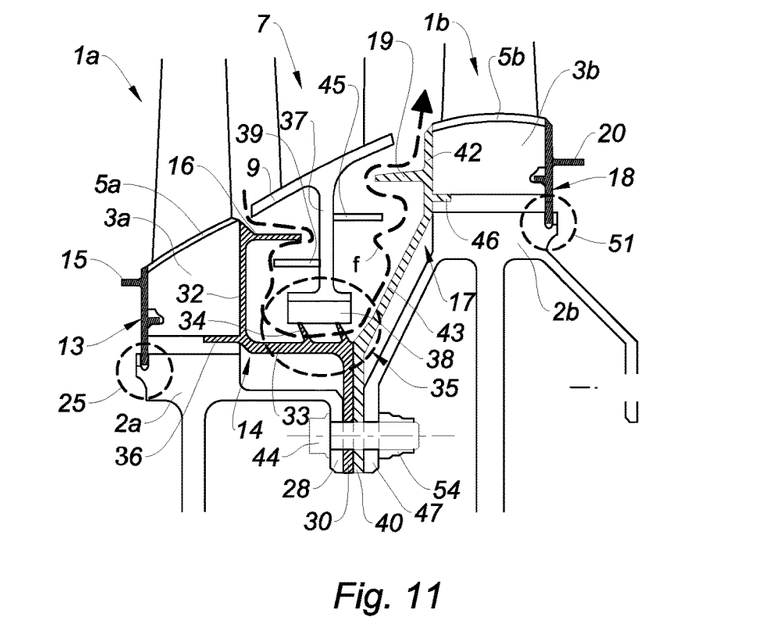
FIG. 11 is a longitudinal sectional view of a portion of the first impeller, of the first guide vane and of the second impeller from FIG. 1 after an eighth mounting step.

It can be seen in FIG. 11 that the transverse annular portion 42 of the upstream plate 17 of the second impeller 1b, forming the upstream axial stop of the vane roots 3b, is joined to the platforms 5b and axially supported against said platforms. The shape of the radial end of the plate 17 is additionally in the continuation of that of the outer surface of the platforms 5b so that it does not disrupt the gas stream F passing through the turbine.

In addition, similarly to the downstream plate 14 of the first impeller 1a, the fingers 46 of the transverse portion 42 of the upstream plate 17 of the second impeller 1b have found their place under vane roots 3b in the grooves 6b of the second impeller 1b, forming a radial stop of the base of said transverse portion 42 of the upstream plate 17.

At the end of this step, the portion of the turbine surrounding the first guide vane is completely assembled in the region of the impellers and the configuration from FIG. 1 can be found.

It will furthermore be noted that the annular flanges 30, 40 for fixing the downstream plate 14 of the first impeller 1a and the upstream plate 17 of the second impeller 1b are joined. Thus, as can be seen in FIG. 1 and FIG. 11, the downstream plate 14 of the first impeller 1a and the upstream plate 17 of the second impeller 1b delimit the radially inner walls of an annular passage through which a leak stream f is forced to pass, which may escape through the radial clearances between the collar 9 of the first guide vane 7 and the platforms 5a, 5b of the vanes of the first 1a and second 1b impellers.

The leak stream f is thus limited in said passage by a succession of obstacles which are, from upstream to downstream, the interposition of the spoiler 16, the downstream plate 14 of the first impeller in front of the axial clearance between the platforms 5b of the vanes of the first impeller and the collar 9 of the guide vane, a baffle between the spoiler 16 of the downstream plate and the upstream spoiler 39 of the guide vane 7, the radial labyrinth seal 35, a baffle between the downstream spoiler 45 of the guide vane 7 and the spoiler 19 of the upstream plate 17 of the second impeller, and the interposition of said spoiler 19 in front of the axial clearance between the collar of the guide vane 7 and the platforms 5b of the vanes of the second impeller 1b.

According to another aspect of the invention, the downstream plate 14 of the first impeller 1a integrally forms the upstream portion of the inner wall of said passage, including the knife-edge seals 34 which participate in the labyrinth seal 35 forming axial sealing under the web 37 of the first guide vane 7, and bearing the spoiler 16 close to the platforms 5a of the vanes.

According again to another aspect that can be deduced from FIG. 11, for the downstream plate 14 of the first impeller 1a as for the upstream plate 17 of the second impeller 1b, the fingers 36, 46 of each plate 16, 17, which pass under the roots 3a, 3b of the vanes, hold the inner radial edge of the transverse annular portion 32, 42 which supports the annular spoiler 16, 19. In this case, during the rotation of impellers 1a, 1b, the centrifugal force of the spoiler 16, 19, which is axially offset with respect to said traverse portion 32, 42, creates a torque around the radially inner base of the transverse portion 32, 42 which drives aid portion towards the roots 3a, 3b of the vanes. In this way, the radial end of each plate 14, 17 is pressed against the platforms 5a, 5b of the vanes. It may be noted that, for the upstream plate 13 of the first impeller 1a and the downstream plate 18 of the second impeller 1b, the corresponding form-fitting connection 25, 51 has the same effect as the axial fingers 36, 46, holding the inner periphery of said plates 13, 18 pressed against the rim 2a, 2b of the disc. In these conditions, the centrifugal force on the spoiler 15, 20 also creates a torque which drives the outer radial edge of each plate 13, 18 towards the platforms 5a, 5b of the vanes.

This is particularly useful for the upstream plates 13, 17 because the spacing of the plate with respect to the platforms 5a, 5b can disrupt the flow reaching the vanes of the turbine impeller 1a, 1b. Furthermore, when said plates 13, 14, 17, 18 are arranged so as to be continuous with the platforms 5a, 5b, this avoids interference openings, which are a source of leak flow.

Figure 12:
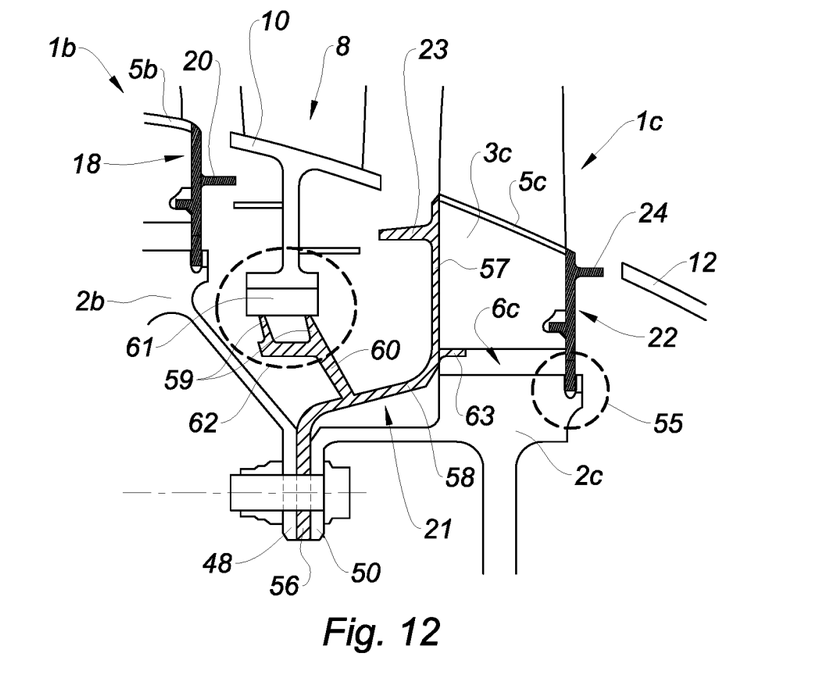
FIG. 12 is a longitudinal sectional view of a portion of the second impeller, of the second guide vane and of the third impeller from FIG. 1 after a twelfth mounting step.

In the example in question, as can be seen in FIG. 12, the configuration of the third impeller 1c with the plates 21, 22 thereof is similar to that of the first impeller 1a, when the upstream and downstream directions are reversed.

The downstream plate 22 in this case is of the same type as the upstream plate 13 of the first impeller 1a, i.e. a transverse flat ring which is fixed by a form-fitting connection 55 to the rim of the third impeller 2c. Said plate also comprises one or more axial fingers which cooperate with grooves in the rim 2c of the disc and the corresponding vane roots 3c so as to circumferentially lock the plate 22. It also comprises an annular spoiler 24 which is designed to be interposed in the axial clearance between the platforms 5c of the vanes of the third impeller 1c and the inner wall 12 of the outlet duct.

Upstream, the third impeller 1c also comprises an assembly ring 50, of which the diameter and the openings through which screws are intended to pass correspond to the diameter and the mounting openings respectively of the assembly ring 48 of the second impeller 1b.

The upstream plate 21 of the third impeller 1c is a variant of the second type of plate, that 14 which is mounted downstream of the first impeller 1a. Said plate 21 comprises:

a transverse annular flange 56 for fixing to the impellers which extends radially towards the inside, which comprises axial holes which are distributed circumferentially and correspond to those in the assembly rings 48, 50 of the second 1b and of the third 1c, a transverse annular portion 57 which is intended to form a stop upstream of the roots 3c of the vanes of the third impeller 1c, and an intermediate portion 58, which in this case has a frustoconical shape.

The upstream plate 21 also bears knife-edge seals 59 which are connected to the intermediate portion 58. However, in this case, the knife-edge seals 59 are connected to the intermediate portion 58 by a frustoconical ring 60 so that the knife-edge seals 59 are correctly positioned opposite the complementary abradable element 61 which is fixed to the second guide vane 8 so as to form a radial labyrinth seal 62. This difference with respect to the previous configuration is due to the geometry of the duct which moves the second guide vane 8 away from the third impeller 1c. The upstream plate 21 also comprises a plurality of fingers 63, starting from the base of the transverse portion 57 and arranged so as to be inserted under roots 3c of the vanes, in the grooves 6c, when the plate is mounted on the third impeller 1c. Said fingers 63 form a radial stop of the upstream plate 21 at the base of the roots 3c of the vanes, as for the downstream plate 14 of the first impeller. The transverse portion 57 of the plate 21 covers the roots 3c as far as the radially inner base thereof and in this case extends radially towards the outside until it makes a joint with the platform 5c of the vanes. In a variation, a cavity can be made in the rim 2c of the disc, for example in a tooth between two grooves 6c, and the finger 63 can be inserted therein, thus being radially supported in the rim 2a itself. Since the plate 21 is mounted axially, said cavity is not necessarily contiguous with a groove 6c.

In order to achieve the configuration, which is described in FIG. 12 and FIG. 1, the mounting of the turbine comprises a ninth step in which the downstream plate 22 is fixed on the third impeller 1c in a manner similar to that which is used in the first step for the upstream plate 13 on the first impeller 1a. In a tenth step, the roots 3c of the vanes are axially inserted in the grooves 6c in the rim 2c of the disc of the third impeller 1c, as for the first impeller 1a in the second step. Then, in an eleventh step, the upstream plate 21 is placed on the third impeller 1c in a manner which is similar to that which is used for the downstream plate 14 on the first impeller 1a, in the third step.

In a twelfth step, the third impeller 1c being assembled with the plates 21, 22 thereof, said impeller is axially mounted behind the assembly obtained at the end of the eighth step, then the assembly ring 50 thereof and the fixing flange 56 of the upstream plate 21 are rigidly connected by means of screws to the downstream assembly ring 48 of the second impeller 1b.

Still with reference to FIG. 12, when the screws passing through the mounting rings 48, 50 are tightened and fix the third impeller 1c against the second impeller 1b, the labyrinth seal 62 which is formed with the second guide vane 8 closes an annular passage connecting the axial clearance between the platforms 5b of the vanes of the second impeller 1b and the inner collar 10 of the second guide vane to the axial clearance between said collar 10 and the platforms 5c of the vanes of the third impeller 1c. The radially inner wall of said passage is formed by the upstream plate 21 of the third impeller 1c, downstream of the labyrinth seal 62. Furthermore, the spoilers 20, 23 on the plates 18, 21, on the one hand, and spoilers on the inner web of the third guide vane 8, on the other hand, form baffles in the radial direction having the same functions as in the case of the first guide vane 7, to limit a leak flow through the annular passage under the second guide vane 8.

It should be noted in particular in this latter case that the fact that the knife-edge seals 59 are rigidly connected to the upstream plate 21 of the third impeller 1c, prevents from having to position, during the mounting, an intermediate part supporting said knife-edge seals. Only the upstream plate 21 of the third impeller 1c intervenes in this case, in addition to the discs of the impellers 1b, 1c, in defining and sealing the annular passage under the second guide vane 8.

The shape and the combination of different plates with impellers, as well as the assembly thereof, have been shown here in detail for a particular turbine. It goes without saying that this example is given purely by way of illustration. The invention can be adapted to other duct shapes of a turbine, or even to compressors. Furthermore, the successive combinations of types of plates mounted on each impeller can be modified according to the configuration of the turbine engine and the mounting steps will thus be adapted. It will be noted that each of the types of plates described can be axially mounted with respect to the impeller and allows axial mounting with respect to the adjacent guide vane on the turbine. The invention thus makes it possible to carry out mounting of the impellers and guide vanes in a turbine or a compressor by a succession of axial mounting steps of the different described parts.

The invention claimed is:

1. A turbine engine impeller having a longitudinal axis, comprising a disc bearing vanes, the roots of which are fitted in grooves which are substantially parallel to an axis of revolution of the disc, the root of each vane being connected to a blade by an integrated platform, the platforms of said vanes cooperating so as to form a radially inner wall of a duct for a flow passing through the blades, the impeller further comprising a first and a second independent annular plates which are fixed to the disc, said first plate being mounted upstream or downstream of the disc by screw and nut, and comprising a transverse annular portion which is supported on an upstream or downstream face of the roots of the vanes, and said second plate being mounted downstream or upstream of the disc and opposite to the first plate according to the longitudinal axis, the second plate comprising a transverse annular portion which is supported on a downstream or upstream face of the roots of the vanes, said second plate comprises a scalloped portion which is shaped so as to cooperate in a form-fitting manner with a complementary scalloped portion of the disc so as to fix said plate to the disc, said scalloped portion bearing against the upstream or downstream face of the disc, wherein said second plate comprises at least one finger extending axially, said finger being inserted in a cavity of the disc, wherein the integrated platform of each vane has no spoiler and stops axially with respect to and is arranged perpendicular to the upstream and downstream transverse faces of the root, in that said transverse annular portion of each of said plates radially covers at least a space separating the integrated platforms and the disc, and bears, between the integrated platforms and the disc, an annular spoiler which is configured to extend in an axial space between the impeller and an adjacent module of the turbine engine without rubbing against an element of said module.

2. The turbine engine impeller according to claim 1, wherein said annular spoiler of each of said first and second plates has a substantially cylindrical general shape.

3. The turbine engine impeller according to claim 1, wherein the outer radial end of said transverse annular portion of at least one of said plates is axially supported on said integrated platforms and/or is flush with a radially outer surface of said integrated platforms.

4. The turbine engine impeller according to claim 1, wherein the transverse annular portion of at least one of said plates covers the root of each vane over the entire radial dimension thereof.

5. The turbine engine impeller according to claim 1, wherein the first plate comprises at least one finger which is axially inserted under the root of a vane and is designed so as to be able to be radially supported under said root so as to create with the spoiler, during a rotation of the impeller, a torque driving said transverse annular portion towards the roots of the vanes.

6. The turbine engine impeller according to claim 1, wherein the first plate comprises a radially inner annular flange for fixing to the disc.

7. The turbine engine impeller according to claim 1, wherein the first plate comprises annular knife-edge seals of a labyrinth sealing joint.

8. The turbine engine impeller according to claim 7, wherein said first plate is arranged so as to form an airtight wall connecting the integrated platforms to the annular knife-edge seals.

9. The turbine engine impeller according to claim 7, wherein the first plate comprises a portion bearing the annular knife-edge seals which is located between the transverse annular portion and a radially inner annular flange for fixing to the disc.

10. A turbine engine turbine comprising at least one turbine engine impeller according to claim 1.

11. The turbine engine impeller of claim 1, wherein said scalloped portion of the second plate comprises a plurality of first teeth extending radially inward and which cooperate with a plurality of second teeth of the disc extending radially outward.

12. The turbine engine impeller of claim 11, wherein each of the plurality of the second teeth has the same pitch and the same radial extension as each of the plurality of the first teeth.

13. The turbine engine impeller of claim 1, wherein each vane is formed in a ceramic matrix composite material.

14. The turbine engine impeller of claim 1, wherein the turbine engine impeller is a low pressure turbine engine impeller.

15. The turbine engine impeller of claim 1, wherein said first plate comprises a transverse annular flange which extends radially towards the inside and comprises first axial holes distributed circumferentially, said disc comprising a ring with at least a second axial hole, said first and second holes receiving said screw and nut for fixing the annular plate to the disc.

16. The turbine engine impeller of claim 1, wherein said complementary scalloped portion of the disc is separated from said the downstream face by a groove, the scalloped portion being inserted in said groove and bearing against the complementary scalloped portion.

17. The turbine engine impeller of claim 1, wherein the first or second annular plate is formed in one single piece.

18. The turbine engine impeller of claim 1, wherein the at least one finger of the second plate is inserted in a cavity in a tooth of the disc.

19. The turbine engine impeller of claim 1, wherein the disc is a downstream disc, the first plate being mounted upstream of a said downstream disc and is coupled to a downstream annular plate of an upstream disc.

20. The turbine engine impeller of claim 1, wherein one of the first and second plates is mounted respectively upstream or downstream of the disc such that a flow circulates on the external surface of at least one of the first plate and second plate.

21. The turbine engine impeller of claim 1, wherein the scalloped portions are configured to lock the second plate axially on the disc and the second plate comprises said at least one finger which is configured to lock the annular plate rotationally around the longitudinal axis.

22. A turbine engine impeller having a longitudinal axis, comprising a disc bearing vanes, the roots of which are fitted in grooves which are substantially parallel to an axis of revolution of the disc, the root of each vane being connected to a blade by an integrated platform, the platforms of said vanes cooperating so as to form a radially inner wall of a duct for a flow passing through the blades, the impeller further comprising a first and a second independent annular plates which are fixed to the disc,
- said first plate being mounted upstream or downstream of the disc by screw and nut, and comprising a transverse annular portion which is supported on an upstream or downstream face of the roots of the vanes, and
- said second plate being mounted downstream or upstream of the disc and opposite to the first plate according to the longitudinal axis, the second plate comprising a transverse annular portion which is supported on a downstream or upstream face of the roots of the vanes, said second plate comprises a scalloped portion which is shaped so as to cooperate in a form-fitting manner with a complementary scalloped portion of the disc so as to fix said plate to the disc, said scalloped portion bearing against the upstream or downstream face of the disc,
- wherein one of the first plate and second plate comprises at least one finger extending axially, said finger being inserted in a cavity of the disc,
- wherein the integrated platform of each vane has no spoiler and stops axially with respect to and is arranged perpendicular to the upstream and downstream transverse faces of the root, in that said transverse annular portion of each of said plates radially covers at least a space separating the integrated platforms and the disc, and bears, between the integrated platforms and the disc, an annular spoiler which is configured to extend in an axial space between the impeller and an adjacent module of the turbine engine without rubbing against an element of said module, wherein the disc is a downstream disc, the first plate being mounted upstream of said downstream disc and is coupled to a downstream annular plate of an upstream disc.

23. The turbine engine impeller according to claim 22, wherein the second plate comprises said at least one finger which extends substantially axially, said finger being inserted in a receiving groove.

24. The turbine engine impeller according to claim 23, wherein said finger is designed so as to be able to be radially and/or circumferentially supported on at least one tooth portion of the downstream disc.

25. The turbine engine impeller according to claim 22, wherein the first plate comprises said finger which is axially inserted under the root of a vane and is designed so as to be able to be radially supported under said root so as to create with the spoiler, during a rotation of the impeller, a torque driving said transverse annular portion towards the roots of the vanes.

26. The turbine engine impeller of claim 22, wherein the turbine engine impeller is a low pressure turbine engine impeller.

27. The turbine engine impeller of claim 22, wherein each vane is formed in a ceramic matrix composite material.

28. The turbine engine impeller of claim 22, wherein the first or second annular plate is formed in one single piece.

29. The turbine engine impeller of claim 22, wherein the second plate comprises said at least one finger which is inserted in a cavity in a tooth of the downstream disc.

* * * * *